(No Model.)

J. S. PARMENTER.
INKSTAND.

No. 557,425. Patented Mar. 31, 1896.

Witnesses.
W. J. Withrow
E. R. Case

Inventor:
J. S. Parmenter
by Fetherstonhaugh & Co.

UNITED STATES PATENT OFFICE.

JAMES SPENCER PARMENTER, OF WOODSTOCK, CANADA.

INKSTAND.

SPECIFICATION forming part of Letters Patent No. 557,425, dated March 31, 1896.

Application filed October 31, 1895. Serial No. 567,545. (No model.)

*To all whom it may concern:*

Be it known that I, JAMES SPENCER PARMENTER, manufacturer, of the town of Woodstock, in the county of Oxford, in the Province of Ontario, Canada, have invented certain new and useful Improvements in Inkstands, of which the following is a specification.

My invention relates to improvements in inkstands; and the object of the invention is, first, to design a simple means whereby when the pen is lifted from the inkstand the cover will open, so that the ink may be used and that when the pen is replaced the cover will resume its position over the mouth of the well or bottle and thereby prevent the evaporation of the ink, and, secondly, to provide a simple means whereby the depth of the ink into which the pen is dipped may be regulated and kept at a uniform depth; and it consists, essentially first, of an ink-bottle which is provided with a cover connected to an arrangement of levers, which when overbalanced at the front of the bottle or well will hold the cover closed, and which when overbalanced at the back will hold the cover open, and, secondly, to provide a well supported by the lever-standard and a supplemental well externally threaded into a corresponding ring secured to the stand, the dipping-well being connected to the well which contains the ink by a series of openings at the bottom thereof, as hereinafter more particularly explained.

Figure 1:
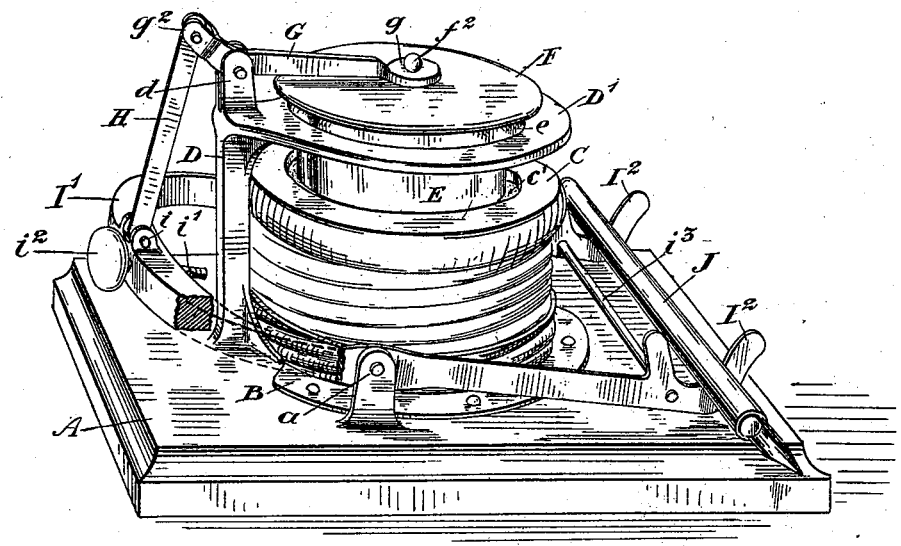
Figure 2:
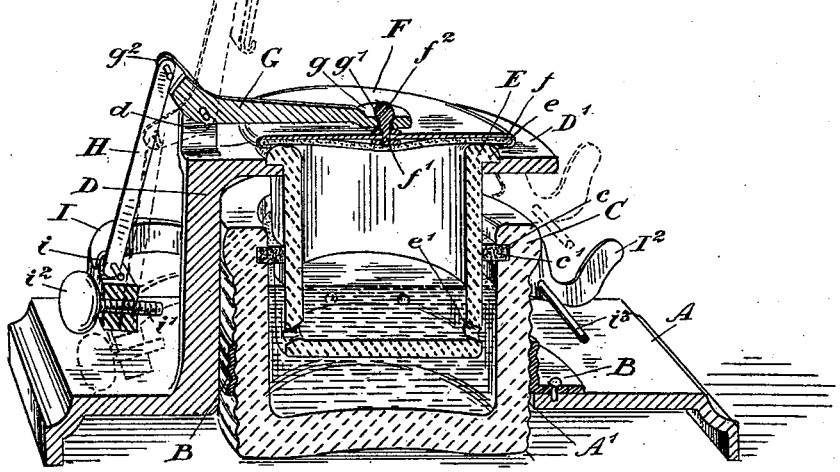

Figure 1 is a perspective view of an inkstand constructed in accordance with my invention, parts being broken away. Fig. 2 is a vertical section through the well and stand.

In the drawings like letters of reference indicate corresponding parts in each figure.

A is the base of the stand; B, a threaded ring secured thereto around a central opening A'; C, an ink-well made of glass or any other suitable material and externally threaded correspondingly to the ring B.

D is a standard which is provided with a forwardly-extending ring D' attached to or forming part of the stand.

E is a supplemental well provided with an outwardly-extending rim $e$, by which it is supported upon the ring D'. At the bottom of the supplemental well E, I provide a series of holes $e'$, which form means for communication between the supplemental well E and well C. Both of these wells may be formed of any suitable material, such as glass or porcelain. The top of the well C is provided with a groove $c$, in which fits a rubber ring $c'$. This ring incloses the periphery of the well E and prevents any ink from evaporating.

It will be seen that the level of the ink will be the same in the wells C and E. The depth of the ink, however, in the well E may be regulated by simply turning around the well C in the desired direction, so as to make the depth shallower or deeper, as desired. As the ink becomes less in the well C, such well may be raised, so as to keep the depth of the ink in the well E uniform.

F is the cover of the ink-well, which is made in circular form and is provided with a layer of rubber F' underneath it secured between the underturned flanges $f$. $f'$ is a rivet provided with a knob-shaped head $f^2$.

G is a lever pivoted between the jaws $d$ at the top of the standard D. The forward end $g$ of the lever G is made circular and provided with a hole $g'$. The rivet $f'$ extends through this hole and the cover is flexibly supported by the knob-shaped head $f^2$.

H is a rod pivotally connected at the top between the jaws $g^2$ of the lever G and at the bottom between the jaws $i$ of the U-shaped lever I, which extends on both sides of the well, and is pivotally supported on the lugs $a$ attached to or forming portion of the base A. Both the standard D and lugs $a$ are preferably cast integral with the base A. The back end of the lever has preferably a weighted portion I' and an adjustable screw $i'$ with a weighted head $i^2$. The front end of the lever is preferably connected by a rod $i^3$ and each end is formed with a crotch I² to receive a pen or pencil J, or other similar article.

It is designed when the pen J is removed that the weight of the back portion of the lever I should overbalance the weight of the cover and thus throw it open into the position shown in dotted lines in Fig. 2. The weight of the rear end of the lever may be regulated by the weighted adjusting-screw $i'$, so that the pen J or other article used may be sufficient to overbalance the rear end to close the bottle when placed in position, as shown in Figs. 1 and 2.

It will be seen from this description that the user of an inkstand constructed in accordance with my invention may, simply by removing his pen preparatory to writing, have the cover thrown off the ink, so that he can immediately get a dip of ink without any extra trouble. When he has finished writing, he may, by simply placing the pen back in position, close the cover and thereby prevent the ink from evaporating. In using red and black ink it will be seen that he will be under no liability of placing the black-ink pen into the red-ink bottle as immediately he uses the black-ink pen and puts it back the cover is closed.

It will be readily understood that butter-coolers in which a knife is used and other articles of a similar nature may be made in which the same means of operation may be employed to close the cover.

What I claim as my invention is—

1. In combination, the base, the standard supported therefrom, the ink-well supported by the standard, the arm intermediately pivoted to said standard, the cover carried by the forward end of said arm, the ears extending from said base, a U-shaped lever pivoted to said ears and having forwardly-extending ends, the central portion of said lever being weighted, the link connecting said weighted portion to the rear end of the lever carrying said cover, and the supplemental adjustable weight connected to said central portion, substantially as described.

2. The combination with the well and means for adjusting it vertically in the stand, of a supplemental well, means for supporting it within the main well and openings at the bottom of the supplemental well as and for the purpose specified.

3. The combination with the well and means for adjusting it vertically in the stand, of a supplemental well, means for supporting it within the main well, openings at the bottom of the supplemental well and a rubber ring inclosing the annular space between the supplemental well and main well as and for the purpose specified.

4. The combination with the supplemental well suitably supported and provided with holes at the bottom, of the main well externally threaded and held in a correspondingly-threaded ring attached to or forming part of the base as and for the purpose specified.

5. The combination with the main well suitably supported in the base, of a supplemental well having holes at the bottom connecting it with the main well and having an outwardly-extending rim at the top and a standard attached to or forming part of the base and provided with a forwardly-extending ring upon the inner edges of which the rim of the supplemental well rests as and for the purpose specified.

JAMES SPENCER PARMENTER.

Witnesses:
B. BOYD,
E. R. CASE.